United States Patent
Roy

(10) Patent No.: US 10,719,667 B1
(45) Date of Patent: Jul. 21, 2020

(54) PROVIDING A NATURAL LANGUAGE BASED APPLICATION PROGRAM INTERFACE

(71) Applicant: Google LLC, Mountain View, CA (US)

(72) Inventor: Howard Scott Roy, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 574 days.

(21) Appl. No.: 14/818,579

(22) Filed: Aug. 5, 2015

Related U.S. Application Data

(60) Provisional application No. 62/187,067, filed on Jun. 30, 2015.

(51) Int. Cl.
*G06F 17/27* (2006.01)
*G06F 40/40* (2020.01)
*G06F 16/9032* (2019.01)

(52) U.S. Cl.
CPC ........ *G06F 40/40* (2020.01); *G06F 16/90332* (2019.01)

(58) Field of Classification Search
CPC ...................................................... G06F 17/27
USPC .... 704/9, 275, 277, 235, 260, 231; 717/140, 717/168, 106, 769, 803; 705/30, 32, 34; 381/56
See application file for complete search history.

(56) References Cited

U.S. PATENT DOCUMENTS

| | | | | |
|---|---|---|---|---|
| 7,647,257 B2 * | 1/2010 | Allen | ...................... | G06Q 20/10 705/30 |
| 8,024,196 B1 * | 9/2011 | Wodtke | ............... | H04M 3/4938 379/90.01 |
| 8,386,960 B1 * | 2/2013 | Eismann | ................. | G06F 9/451 715/835 |
| 8,417,513 B2 * | 4/2013 | Prompt | ................... | G06F 40/56 704/9 |

(Continued)

OTHER PUBLICATIONS

Androutsopoulos et al, Natural Language Interfaces to Databases—An Introduction, 1994, Department of Artificial Intelligence, University of Edinburgh & Department of Computer Science, University of Edinburgh, All pages (Year: 1994).*

(Continued)

*Primary Examiner* — Michael Colucci
(74) *Attorney, Agent, or Firm* — Fish & Richardson P.C.

(57) ABSTRACT

Methods, systems, and apparatus, including computer programs encoded on computer storage media, for providing a natural language based program interface to software applications. One of the methods includes, obtaining, via a natural language front end, a natural language query or a natural language update statement issued by a software application; converting the natural language query or natural language update statement into structured operations to be performed on APIs of a knowledge base; performing the structured operations on the APIs to produce a natural language output statement; and providing, via a natural language output interface, the natural language output statement to the software application. The knowledge base stores (Continued)

entity information according to a data schema and has structured APIs for use by software applications to query the knowledge base; the software applications are limited to communicating with the knowledge base through the interfaces provided by the natural language front end.

23 Claims, 4 Drawing Sheets

(56) References Cited

U.S. PATENT DOCUMENTS

| | | | | |
|---|---|---|---|---|
| 9,213,760 | B2* | 12/2015 | Betz | G06F 16/337 |
| 9,436,382 | B2* | 9/2016 | Wilensky | G06F 3/0488 |
| 9,715,875 | B2* | 7/2017 | Piernot | G10L 15/26 |
| 2004/0111259 | A1* | 6/2004 | Miller | G10L 15/19 |
| | | | | 704/231 |
| 2004/0156490 | A1* | 8/2004 | Adams | G06Q 30/04 |
| | | | | 379/126 |
| 2010/0281458 | A1* | 11/2010 | Paladino | G06F 8/71 |
| | | | | 717/106 |
| 2011/0055256 | A1* | 3/2011 | Phillips | G10L 15/30 |
| | | | | 707/769 |
| 2011/0202905 | A1* | 8/2011 | Mahajan | G06F 8/43 |
| | | | | 717/140 |
| 2013/0073280 | A1* | 3/2013 | O'Neil | G06F 40/20 |
| | | | | 704/9 |
| 2014/0081625 | A1* | 3/2014 | Wilensky | G06F 40/279 |
| | | | | 704/9 |
| 2015/0242384 | A1 | 8/2015 | Reiter | |
| 2015/0242385 | A1* | 8/2015 | Bao | G06F 40/284 |
| | | | | 704/9 |
| 2016/0021202 | A1* | 1/2016 | Peterson | H04L 67/22 |
| | | | | 709/204 |

OTHER PUBLICATIONS

Temperley et al., "Link Grammar," Carnegie Mellon University, School of Computer Science, Apr. 2015 [retrieved on Aug. 4, 2015]. Retrieved from the Internet: URL<http://www.link.cs.cmu.edu/link/>, 2 pages.

Hackernoon.com [online], "Introducing the First Natural Language to SQL API" Jul. 2018, [retrieved on Aug. 29, 2019], retrieved from: URL <https://hackernoon.com/introducing-the-first-natural-language-to-sql-api-8429229301ce>, 6 pages.

Oracle.com [online], "Oracle Knowledge Intelligent Search Language Tuning Guide: A Guide to Tuning Oracle Knowledge Intelligent Search", Mar. 2015, [retrieved on Aug. 29, 2019], retrieved from: URL <https://docs.oracle.com/cd/E38110_03/ok_8.6_is_lang_tuning_gd.pdf>, 158 pages.

Sathick et al, "Natural Language to SQL Generation for Semantic Knowledge Extraction in Social Web Sources" Middle-East Journal of Scientific Research, 2014, 10 pages.

* cited by examiner

PROVIDING A NATURAL LANGUAGE BASED APPLICATION PROGRAM INTERFACE

CROSS REFERENCE TO RELATED APPLICATIONS

This application is a non-provisional of and claims priority to U.S. Provisional Patent Application No. 62/187,067, filed on Jun. 30, 2015, the entire contents of which are hereby incorporated by reference.

TECHNICAL FIELD

This specification relates to providing a natural language application program interface (API).

SUMMARY

In general, this specification describes technologies for providing a natural language based API, e.g., to enable natural language communications between multiple software applications and a knowledge base.

In general, one innovative aspect of the subject matter described in this specification can be embodied in methods that include the actions of obtaining, via a natural language front end, a natural language query or a natural language update statement issued by a software application; converting the natural language query or natural language update statement into structured operations to be performed on APIs of a knowledge base; performing the structured operations on the APIs to produce a natural language output statement; and providing, via a natural language output interface, the natural language output statement to the software application. The knowledge base stores entity information according to a data schema and has structured APIs for use by software applications to query the knowledge base; the software applications are limited to communicating with the knowledge base through the interfaces provided by the natural language front end.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Efforts for providing an application interface between one software application and another software application can be reduced: two applications can communicate in a mutually recognized natural language. This limits the need for programmers to learn a new API for each application. The natural language API can also be more stable over time than an API that depends on programmatic data structures, so that there is less effort in updating client applications. Overhead and inaccuracy arising from intermediary API syntax conversions can be avoided: processing a request expressed using a natural language into programming statements operable on an API can be deferred to the application that eventually fulfills the request. Certain trade secrets can also be maintained: system designs, e.g., data structures and database schemas, can be withheld from outsiders, without disrupting communications with them.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Users may prefer communicating with software applications using a natural language, as it may relieve them from having to learn special syntax for such communications.

Likewise, enabling communications between different software applications in a natural language may provide similar benefits.

Figure 1:
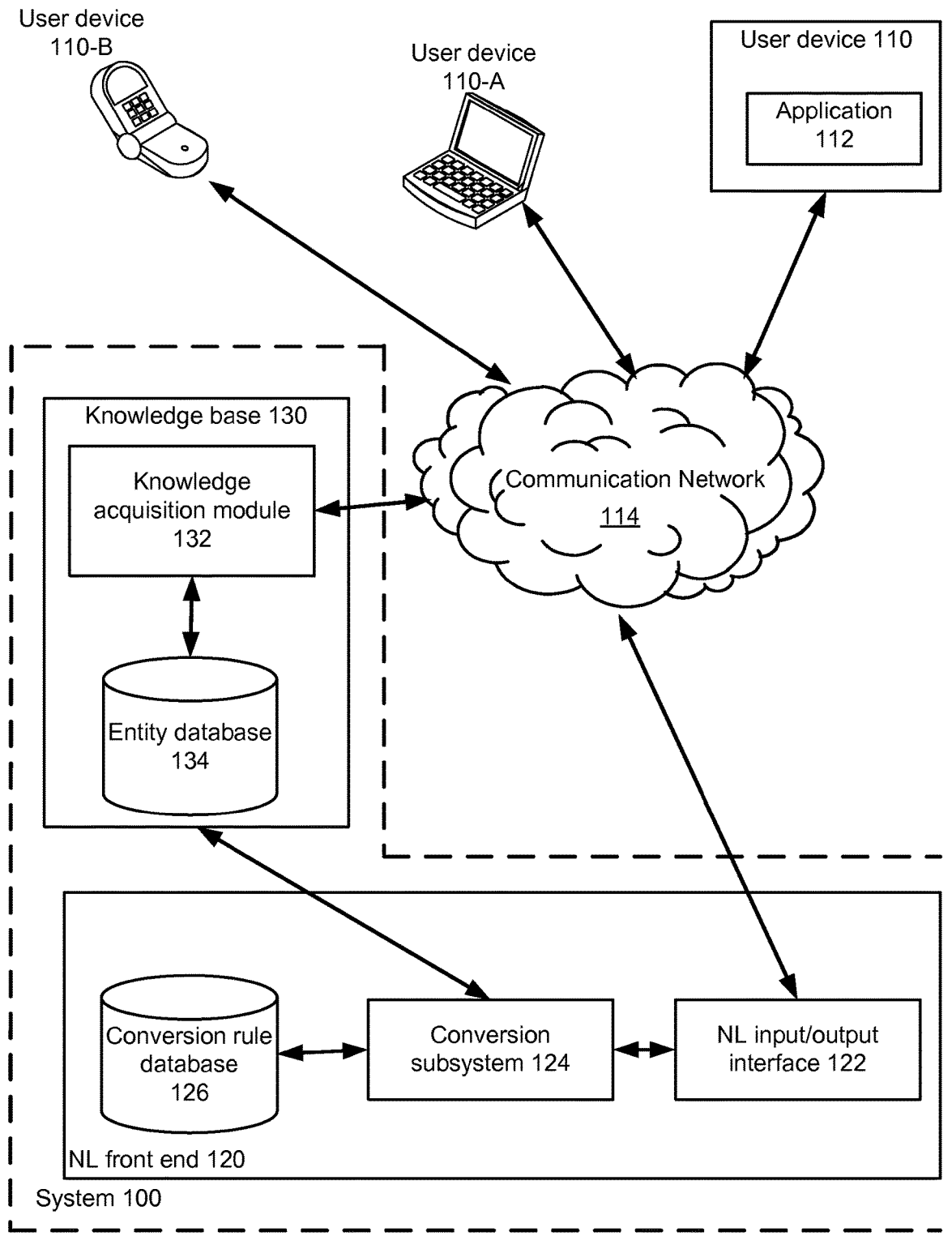
FIG. 1 is a block diagram illustrating an example system for providing a natural language based API.

FIG. 1 is a block diagram illustrating an example system 100 for providing a natural language based API.

The system 100 includes a natural language (NL) front end 120 and a knowledge base 130. The system 100 obtains natural language queries and update statements from one or more user devices 110 and converts them into structured operations, e.g., programming statements, to be performed on the knowledge base's APIs. While performing these operations, the system 100 withholds, e.g., does not reveal, information identifying the knowledge base's APIs, e.g., syntax, input parameters, and output parameters, from applications on the user device.

The NL front end 120 includes an NL input/output interface 122, a conversion subsystem 124, and a conversion rule database 126. The NL input/output interface 122 receives, from software applications on user devices, natural language queries and natural language update statements and, when the system 100 finishes processing these queries and update statements, provides corresponding natural language output statements back to the software applications. The input and the output can also identify objects in the knowledge base using identifiers supplied by the software applications running on user devices.

The conversion subsystem 124 converts natural language queries and natural language update statements received from software applications into structured operations to be performed on APIs of the knowledge base 130. The conversion subsystem performs these conversions based on conversion rules specified in the conversion database 126.

The conversion database 126 stores rules, e.g., mappings, for generating structured operations to be performed on APIs of the knowledge base 130 based on natural language queries and natural language update statements. For example, based on (1) the configuration that a knowledge base stores entity information using data tables and (2) the names of these tables specified in an application schema, which is explained in greater detail with reference to FIG. 4, a conversion rule may specify that a natural language query, "Who is the first president of the United States?" should be converted to a structured query language (SQL) statement "Select Name From Table President where sequence=1 and country=United State."

Conversion rules stored in the conversion database 126 may be specific to an application schema, the data schema used by the underlying knowledge base, or both. For example, if the underlying knowledge base stores entity information using a graph structure that uses nodes to represent entities and edge to represent relationship between the entities, the conversion rules may specify how a natural language query or update statement is to be parsed to generate statements, e.g., input parameter, operands between these input parameters, and output parameters, for querying the graph structure.

For example, after receiving the natural language query, "Who is the first president of the United States?" the system may use conversion rules to generate the following statements: 1. find node connected with the Node "US president" by the "$1^{st}$" edge; and 2. retrieve the node's name "George Washington."

The knowledge base 130 includes a knowledge acquisition module 132 and an entity database 134. The knowledge base 130 provides structured APIs for use by software applications to query and update the entity database 134.

The knowledge acquisition module 132 obtains, from external sources, e.g., the Internet, additional entity information and stores it in association with existing entity information in the entity database 134 and according to the data schema of the knowledge base. The knowledge acquisition subsystem may communicate directly with external sources, bypassing the NL frontend 120. In some implementations, when communicating with external sources, the knowledge acquisition subsystem 132 withholds information identifying the data schema of the entity database 130 from the external sources. For example, when copying data from an external database application, the knowledge acquisition subsystem does not need to reveal either reveal the destination location of the data being copied to the external database application or whether its own knowledge base is stored as a graph, a table, or in some other form.

The entity database 134 stores information about entities, which are also referred to as entity information in this specification, e.g., dates of birth of different people, addresses for businesses, and relationships between multiple organizations, according to a data schema. In some implementations, the entity database 134 stores entity information using a table structure. In other implementations, the entity database 134 stores entity information in a graph structure.

A data schema describes the entity database's structure, using a formal language supported by the entity database's database management system (DBMS) and refers to the organization of entity information as a blueprint of how a database is logically constructed, e.g., dividing entity information into database tables when the entity database is a relational database.

A data schema can include a set of formulas representing integrity constraints specific to an application, e.g., which columns in a table the application can access and how input parameters should be organized into query a certain table. In a relational database, a data schema may define, for example, the tables, fields, relationships, views, indexes, packages, procedures, functions, queues, triggers, types, sequences, materialized views, synonyms, database links, directories, XML schemas, and other elements.

In some implementations, the system allows access by an application on a user devices to the entity database 134 only through the NL front end 120. For example, all natural language queries and update statements generated by applications on a user device must be processed by the NL front end first, in order to access the knowledge base.

In some implementations, the knowledge base 130 includes an index module to create indices of entities information stored in the knowledge base 130. The index module may create these indices on a predefined schedule or randomly, e.g., to enable faster future data access.

In some implementations, the knowledge base 130 also includes a ranking module to rank, based on predefined criteria, entities information stored in the knowledge base 130. For example, entity information that is frequently accessed is ranker higher than the less frequently accessed.

Figure 2:
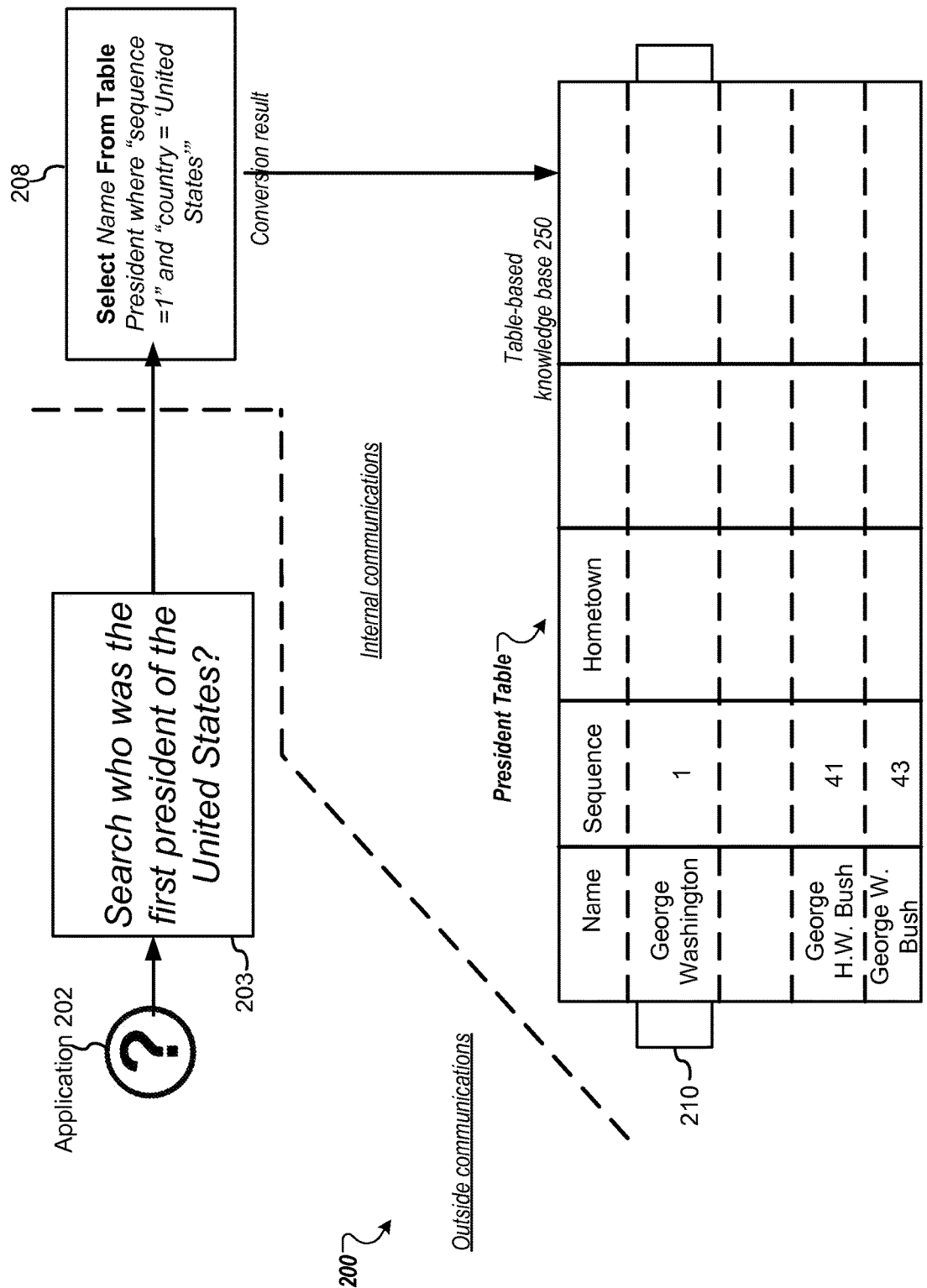
FIG. 2 is a flow diagram illustrating an example process for providing a natural language based API to a software application.

FIG. 2 is a flow diagram illustrating an example process 200 for providing a natural language based application program interface to a software application. For convenience, the process 200 will be described as being performed by a system of one or more computers, located in one or more locations, and programmed appropriately in accordance with this specification. For example, the system 100 of FIG. 1, appropriately programmed, can perform the process 200.

The process 200 begins with the system obtaining a natural language query 203 from software application 202. The application 202 may, but need not, generate the natural language query 203 based on a user interaction with the application 202, and the natural language query 203 may be different from a query received directly from the user.

In other words, the natural language queries and update statement referred to in this specification are not provided, e.g., typed in, directly or entirely by a user. For example, a user device may prepare a natural language query based on user selections of multiple user interface controls enabled in an application. For example, when a user selects (1) a "US" radio button, (2) a "$1^{st}$" item from a drop-down list, and (3) a "President" checkbox in an application, the application based on these selections generates a natural language query "Search who is the first president in the United State?" and sends this natural language query to the system 100 to obtain search results matching the natural language query.

After obtaining the natural language query 203, the system converts the natural language query 203 into one or more structured operations 208 to be performed on the knowledge base APIs.

In the example shown in in FIG. 2, because the conversion rules specify that the knowledge base 250 stores entity information using data tables and the knowledge base's APIs are SQL based, the system converts the natural language query 203 into an SQL query statement 208. For example, "Search who is the first president of the United States?" might be converted to "Select Name From Table President where sequence=1 and country=United State."

The system executes the SQL query statement on the knowledge base 250 and obtains the SQL query result "George Washington."

The system then converts the SQL query result "George Washington" in to a natural language output statement "George Washington is the first president of the United States" before providing this natural language output statement to the application 202.

The system can augment a natural language query statement with application identifiers for objects in the knowledge base. For example, a natural language output might include the Freebase mid /m/034rd as an annotation on George Washington's name. The a natural language output can also include a set of results using these identifiers in addition to the natural language output statements. These techniques ensure that the calling application, e.g., the application that provided the natural language input statement or the natural language query, does not need to be configured to parse natural language text, but can instead process a regular output representation.

In some implementations, the system withholds information that can identify an application scheme or the data schema of the knowledge base, from the application 202. For example, the system may hide, from the application 202, the fact that the knowledge base 250 is implemented in a table structure. For example, the system may omit or modify the names of the table or columns used in the knowledge base 250, e.g., "Sequence," "Hometown," and "Successor," when providing a natural language output statement to the application 202.

In some implementations, queries issued by the application 202 to the knowledge base 250 are limited to natural language queries supported by the system 200, e.g., in an English language format. In other words, the system 200 will not process queries of other types, e.g., SQL queries, issued by the application 202 to the knowledge base 250.

In some implementations, in addition to the natural language query, an application can provide a natural language description of the context in which the natural language query is issued. For example "The user is looking at three results. His last query was 'who is George Washington.'" The use of context enables a natural language processing system to understand queries, e.g., "when was he born?" where it needs to resolve the pronoun 'he' to its actual reference in the context. Instead of providing context with the query, an application can also send natural language update statements separately and store the context in the knowledge base.

These techniques can be advantageous, because making changes to the data schema of the knowledge base would not require any changes, e.g., syntax or semantics, to query statements issued by the application 202. These techniques can relieve not only applications accessing a knowledge base from having to modify their existing APIs to accommodate changes to the data schema of the knowledge base, but also users of these applications from having to learn syntax and programming skills needed for using these new APIs.

Note that, while executing the process 200, the system does not make known information internal to the knowledge base, e.g., names of the data tables in the knowledge base, names of the columns in those data tables, and names of the pre-programmed routines or functions and their input/output parameters, to the application 202. Thus, confidential or proprietary information can be maintained without disrupting communications with external parties.

Figure 3:
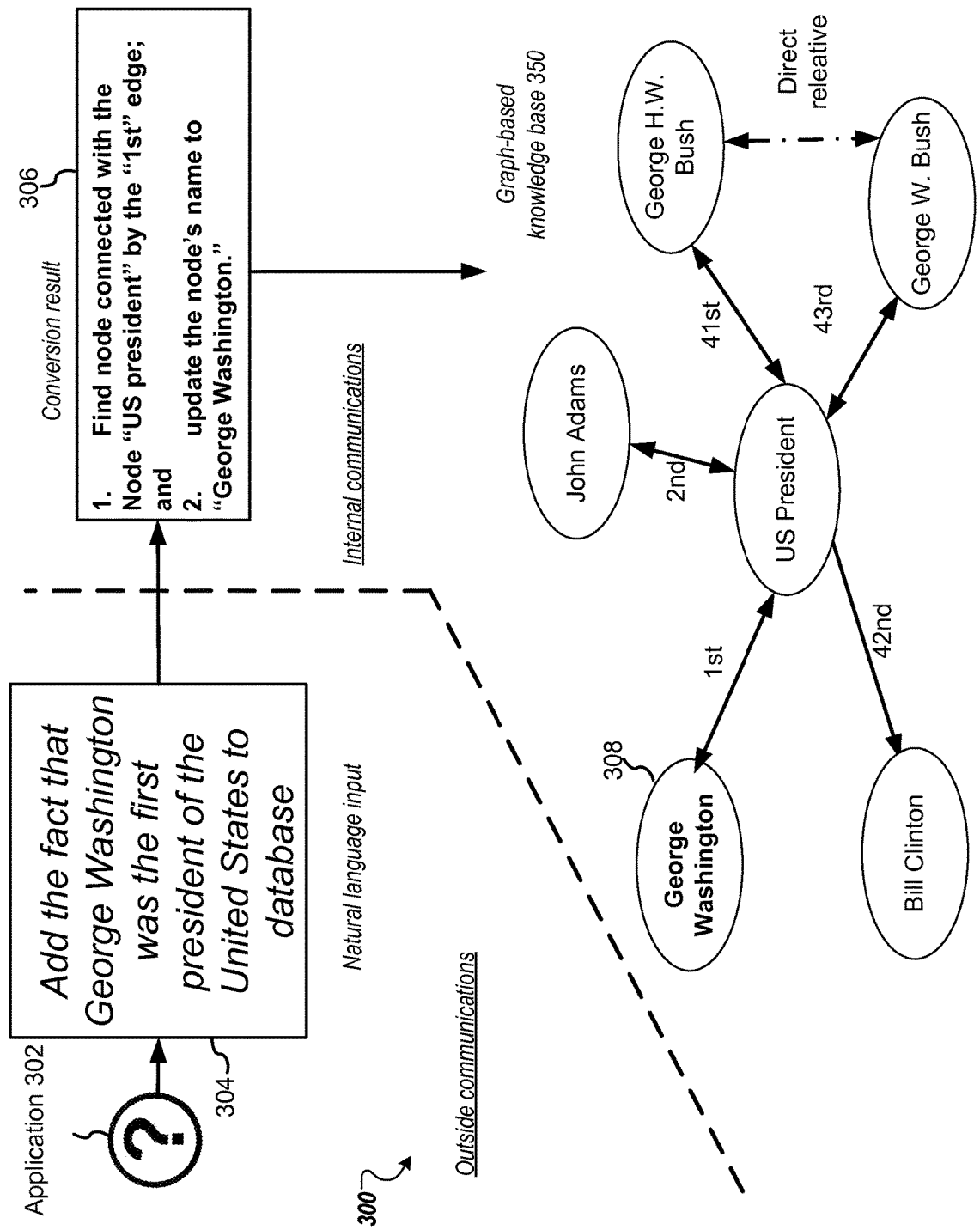
FIG. 3 is a flow diagram illustrating an example process for providing a natural language based API to a software application.

FIG. 3 is a flow diagram illustrating an example process 300 for providing a natural language based application program interface to a software application. For convenience, the process 300 will be described as being performed by a system of one or more computers, located in one or more locations, and programmed appropriately in accordance with this specification. For example, the system 100 of FIG. 1, appropriately programmed, can perform the process 300.

The process 300 begins with the system obtaining, from a software application 302, a natural language update statement 304, e.g., "Add the fact that George Washington was the first president of the United States to the database."

In some implementation, an application can provide an application identifier as annotations to natural language queries it issues. For example, an application can issue statement "add the fact that George Washington [id:/sj312] was the first president of the United State," where the phrase "[id:/sj312]" represents the application identifier. When responding to a natural language query, the knowledge base can identify results to a natural language query in accordance with an application identifier so that an application can access and obtain results or answers from its own ontology.

To update entity information in the knowledge base 350, the system first converts the natural language update statement 304 into one or more structured operations 306 operable on the APIs of the knowledge base 350. Similar to the example shown in FIG. 2, the application 302 is limited to communicating with the knowledge base 350 through the system 300 using natural language queries or update statements.

The system next uses conversion rules that specify how to convert a natural language update statement into a structured operation operable on the APIs of the knowledge base 350. In the process 300 shown in FIG. 3, the conversation rules specify that natural language queries or update statements are converted into programming languages operable on a data graph; accordingly, the system 300 converts the natural language update statement 304, e.g., "Add the fact that George Washington was the first president of the United States to the database" into programming statements that can update the name of a node in the graph-based knowledge base 350, e.g., two programming language statements that express the operations: find node connected with the Node "US president" by the "1st" edge; and update the name of that node to "George Washington."

Once the system 300 executes the structured operations 306 on the knowledge base 350, the system 300 can obtain output, if any, and convert the output into natural language output statements. The system 300 can also include a set of results in addition to the natural language output. The system 300 can then send these natural language output statements and results to the application 302. The application 302 may display the natural language output statements to a user without further processing, as the user can readily understand the natural language output statements. The application can also use the natural language output or the set of results to update its own data internal data structures.

The conversion processes, e.g., from a natural language query to a structured operation and from an operation output to a natural language output statement, are described in greater detail with reference to at least FIG. 4.

Figure 4:
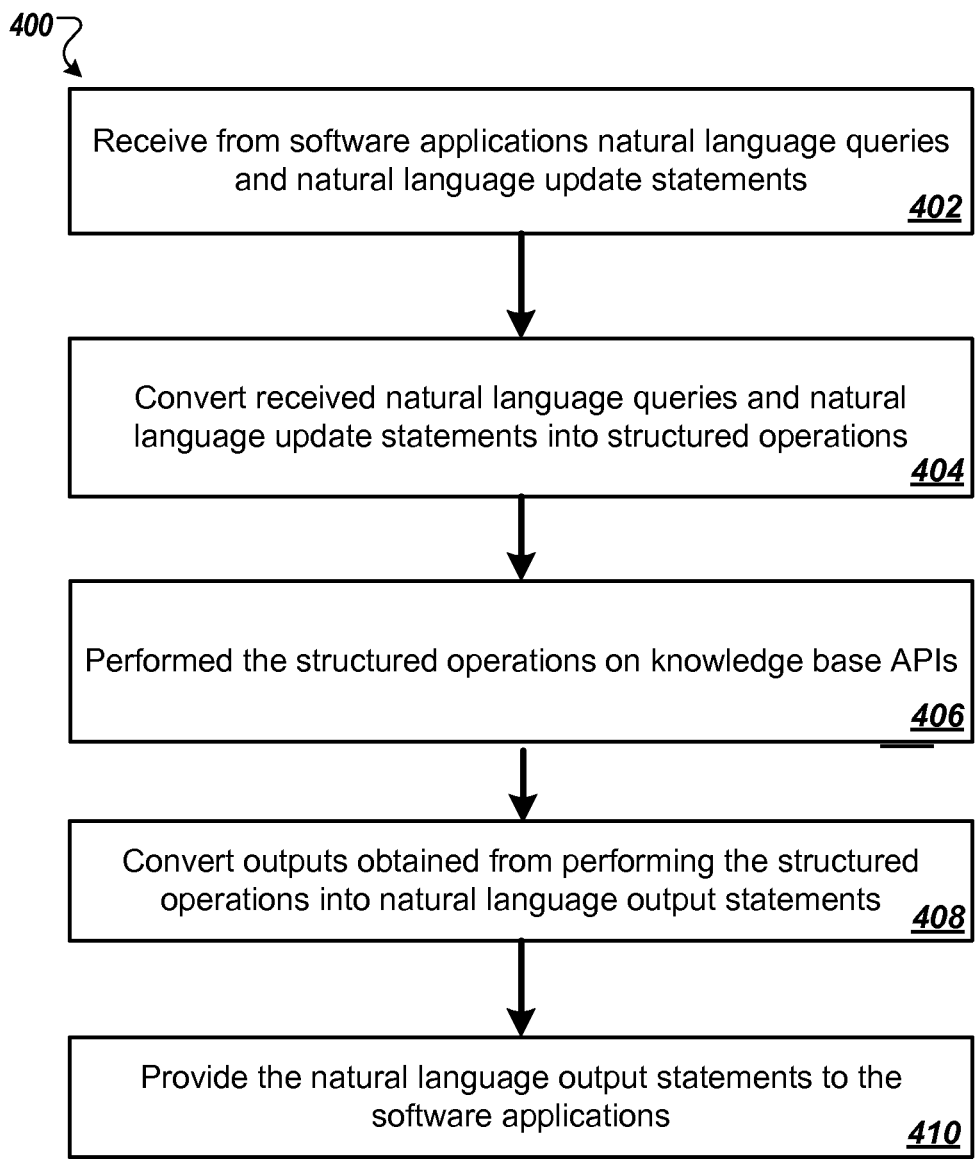
FIG. 4 is a block diagram of an example process for providing a natural language based API.

FIG. 4 is a block diagram of an example process 400 for providing a natural language based application program interface. For convenience, the process 200 will be described as being performed by a system of one or more computers, located in one or more locations, and programmed appropriately in accordance with this specification. For example, the system 100 of FIG. 1, appropriately programmed, can perform the process 400.

The process 400 begins with system receiving from software applications natural language queries and natural language update statements (402).

For example, a natural language query can be "What's on Food Network"; "What sports are on"; "Any basketball"; "Put on the Warriors game"; or "Put on CNN."

The system then converts received natural language queries and natural language update statements into structured operations (404) to be performed on a knowledge base according to an application scheme.

In some implementations, as part of the conversion process, the system first parses the received natural language queries and natural language update statements using a natural language parser. For example, the system may parse the natural language query "Show me the baseball games that are on tonight" to produce the following parser output:

(S (VP Show
(NP me)
(NP (NP the baseball games)
  (SBAR (WHNP that)
    (S (VP are
      (PRT on)
      (NP tonight)))))))

The natural language parser may be an application specific parser or a universal grammar that is application independent. The natural language parser can be the Link Grammar Parser available at http://www.link.cs.cmu.edu/link/.

The system then converts the parser output into structured operations (404) to be performed on a knowledge base according to an application scheme.

An application schema is a data structure that defines a mapping between (1) natural language terms included in the parser output and (2) term included in the data schema of the knowledge base, e.g., table or column names, or terms describing structured operations operable on the knowledge base, e.g., SELECT . . . FROM, DELETE, or UPDATE.

An application schema may describe the types of objects, properties, relationships, and actions that an application understands. The notation defines types using the syntax Type:(attribute:Type [options]). An application scheme can be written in JSON or SQL.

Below is an example application schema for a software application for remotely controlling a TV:

Program: (
  type: NOUN,
  name: Text,
  summary: Text,
  channel: Channel ["on"],
  series: Series,
  episode: Episode,
  start: Time ["on at", "on now"],
  end: Time,
  is_on: Boolean,
  format: Format
)
// A named channel
// Examples: ESPN, WGN, Food Network
Channel: (
  type: NOUN,
  station ["on"]: Station,
  is_hidef: Boolean,
  is_subscribed: Boolean,
  is_favorite: Boolean
)
// A numeric station ID
// Examples: 747, 7.2
Station: (
  type: NOUN,
  number: Number
)
// An ongoing TV series
// Examples: So You Think You Can Dance, Chopped
Series: (
  type: NOUN,
  name: Text
)
// A particular episode of a TV series
// Examples: Star Trek—The Trouble with Tribbles
Episode: (
  type: NOUN,
  name: Text
)
// Program format
// Examples: 1080i, 480p
Format: (
  type: ADJECTIVE,
  name: Text,
  is_hidef: Boolean
)
// Put on something else
ChangeChannel ["put on", "switch to"]: (
  type: VERB,
  to: Program|Channel|Station
)
// Display information
Display [question]: (
  type: VERB,
  what: *
).

The quoted texts in brackets, e.g., "put on" and "switch to," represent natural language terms that may be present in a parser output. The quoted texts in brackets are extendable. In other words, the system can add, change, or remove terms in the quoted texts, to properly process natural language queries and natural language update statements that include terms not presented in the quoted texts.

In some implementations, the system also converts the parser output into structured operations according to an application context. An application context can be a list of all visible objects in an application, expressed using the types, attributes, and relationships of the application schema. For example, active user interface objects, e.g., visible documents or UI elements, as well as objects in recent actions may be ranked higher. In the TV remote control application example discussed above, the application context may include name of the UI elements visible to a user, e.g., the "President" checkbox, when the user natural language query is issued.

The application context may also include information of entities a user is interacting with. For another example, after receiving a natural language query "give me an equally popular show," the system may determine application context based on a popularity rating of a show a user is watching and query the knowledge based for a different TV show that has a similar popularity rating.

Using the example application schema shown above, the system may make the following conversions from a natural language query or a natural language update statement to one or more structured operations:

"What's on Food Network?"
→Display(what:progam_38923)
" . . . Switch to that"
→ChangeChannel(to:program_38923)
"What sports are on?"
→Display(what:(program_232, program_9283, program_14, program_3823))
" . . . Any basketball?"
→Display(what:(program_232, program_3823))
" . . . Put on the Warriors game"
→ChangeChannel(to:program_3823)
"Put on CNN"
→ChangeChannel(to:channel_CNN)
" . . . Show me the same program in hidef"
→ChangeChannel(to:channel_CNNHD).

The system next performs the produced structured operations on knowledge base APIs (406). After receiving outputs from performing the structured operations into natural language output statements, the system converts outputs obtained from performing the structured operations into natural language output statements (408).

In some implementation, the system uses a parser to convert outputs obtained from performing the structured operations into natural language output statements. For example, an output string "George Washington" is parsed, with terms included in the original natural language query "Who was the first president of the United States?" to produce the natural language output statement "George Washington is the first president of the United States."

The system provides the natural language output statements to the software applications (410). For example, responsive to the natural language query "What's on Food Network?" the system may provide the following natural language output statement to an application, "The Top Chief is on right now." For example, responsive to the natural language update statement "User Tom likes the Food Network channel," the system may update in the entity database to mark the Food Network channel as a favorite channel of the user Tom and provide the following natural language output statement as a confirmation to an application, "Noted."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
    a knowledge base and a natural language front end, wherein the knowledge base and the natural language front end are implemented on one or more computers and one or more storage devices;
    wherein the knowledge base stores structured content items according to a data schema and provides a structured application program interface (API) and not a natural language interface for receiving queries of and updates to the knowledge base from software applications;
    wherein the natural language front end is configured to (i) enable multiple software applications to interact with the knowledge base using a natural language interface provided by the natural language front end and (ii) interact with the knowledge base using the structured API of the knowledge base, and wherein the natural language front end includes:
        a natural language input interface to receive, from the software applications, natural language queries and natural language update statements;
        a conversion database and a conversion subsystem that are configured to:
            convert natural language queries to structured API query operations of the structured API of the knowledge base;
            convert natural language update statements to structured API update operations of the structured API of the knowledge base;
            perform the structured API query operations on the structured API of the knowledge base to obtain one or more structured content items from the knowledge base;
            perform the structured API update operations on the structured API of the knowledge base to cause the knowledge base to update structured content items of the knowledge base;
            convert structured content items obtained by performing the structured API query operations to natural language output statements; and
            perform at least one of (i) augmenting at least one of the natural language queries by adding, to the natural language query, an identifier for one or more objects in the knowledge base that are referenced in the natural language query, or (ii) providing, with at least one of the natural language output statements, one or more identifiers that are recognized by the software application that provided the natural language query that corresponds to the natural language output statement; and
        a natural language output interface to provide the natural language output statements to the software applications.

2. The system of claim 1, wherein the conversion database and conversion subsystem are configured to:
obtain one or more respective data identifiers for one or more data items in structured content items obtained by the structured API query operations; and
include the one or more data identifiers to identify terms in the natural language output statements.

3. The system of claim 1, wherein the natural language front end is further configured to provide non-natural language output statements corresponding to the natural language output statements.

4. The system of claim 1, wherein each software application in the multiple software applications includes a natural language query generation module to generate a natural language query according to a user interaction that is other than providing the natural language query with a software application.

5. The system of claim 1, wherein:
the conversion database includes a respective application schema for each of one or more of the software applications, wherein each application schema defines mappings between (i) terms in the natural language queries and the natural language update statements received from the software application corresponding to the respective application schema, and (ii) terms included in the data schema of the knowledge base; and
the conversion database includes the data schema of the knowledge base.

6. The system of claim 1, wherein:
the knowledge base is a structured query language (SQL) database; and
the structured API operations are SQL statements.

7. The system of claim 1, wherein the conversion database and the conversion subsystem are configured to augment at least one of the natural language queries by adding, to the natural language query, an identifier for one or more objects in the knowledge base that are referenced in the natural language query.

8. The system of claim 1, wherein the conversion database and the conversion subsystem are further configured to receive contextual data, from the multiple software applications, that indicates a description, separate from user input, of a context of a user device when the natural language query was issued by a user of the user device; and
wherein the conversion database and the conversion subsystem are configured to convert the natural language queries to the structured API query operations based on the contextual data.

9. The system of claim 1, wherein the conversion database and the conversion subsystem are configured to provide, with at least one of the natural language output statements, one or more identifiers that are recognized by the software application that provided the natural language query that corresponds to the natural language output statement.

10. A method performed by a natural language front end running on a system of one or more computers, the method comprising:
receiving, by a natural language interface of the natural language front end, from multiple software applications, natural language queries and natural language update statements directed to a knowledge base that stores structured content items according to a data schema and provides a structured application program interface (API) and not a natural language interface for receiving queries of and updates to the knowledge base from software applications, wherein the natural language front end is configured to (i) enable multiple software applications to interact with the knowledge base using a natural language interface provided by the natural language front end and (ii) interact with the knowledge base using the structured API of the knowledge base;
performing, by a conversion subsystem using a conversion database, operations comprising:
converting the natural language queries to one or more structured API query operations of the structured API of the knowledge base;
converting the natural language update statements to structured API update operations of the structured API of the knowledge base;
performing the structured API query operations on the structured API of the knowledge base to obtain one or more structured content items from the knowledge base;
performing the structured API update operations on the structured API of the knowledge base to cause the knowledge base to update structured content items of the knowledge base;
converting structured content items obtaining by performing the structured API query operations to natural language output statements;
performing at least one of (i) augmenting at least one of the natural language queries by adding, to the natural language query, an identifier for one or more objects in the knowledge base that are referenced in the natural language query, or (ii) providing, with at least one of the natural language output statements, one or more identifiers that are recognized by the software application that provided the natural language query that corresponds to the natural language output statement; and
providing, by a natural language output interface of the natural language front end, the natural language output statements to the software applications.

11. The method of claim 10, wherein each software application in the software applications includes a natural language query generation module to generate a natural language query according to a user interaction that is other than providing the natural language query with a software application.

12. The method of claim 10, further comprising:
obtaining one or more respective data identifiers for one or more data items in structured content items obtained by the structured API query operations; and
including the one or more data identifiers to identify terms in the natural language output statements.

13. The method of claim 10, further comprising:
providing non-natural language output statements corresponding to the natural language output statements.

14. The method of claim 10, wherein:
the conversion database includes a respective application schema for each of one or more of the software applications, wherein each application schema defines mappings between (i) terms in the natural language queries and the natural language update statements received from the software application corresponding to the respective application schema, and (ii) terms included in the data schema of the knowledge base; and
the conversion database includes the data schema of the knowledge base.

15. The method of claim 10, wherein:
the knowledge base is a SQL database; and
the structured API operations are SQL statements.

16. The method of claim 10, wherein the natural language queries and natural language update statements are received through a communication network from software applications on different user devices.

17. The method of claim 10, wherein the natural language front end receives and responds to the natural language queries and natural language update statements from the multiple applications (i) without revealing to the applications syntax, input parameters, and output parameters of the APIs of the knowledge base to the software applications, and (ii) without revealing to the applications a form in which the knowledge base stores the obtained one or more structured content items.

18. One or more non-transitory computer storage media encoded with a computer program, the computer program comprising instructions that when executed by a natural language front end running on a system of one or more computers cause the natural language front end to perform operations comprising:
  receiving, from multiple software applications, natural language queries of a knowledge base and natural language update statements to the knowledge base, wherein the knowledge base stores structured content items according to a data schema and provides a structured application program interface (API) and not a natural language interface for receiving queries of and updates to the knowledge base from software applications;
  converting the natural language queries into one or more structured API query operations for the structured API of the knowledge base;
  converting the natural language update statements to structured API update operations of the structured API of the knowledge base;
  performing the structured API query operations on the structured API of the knowledge base to obtain one or more structured content items from the knowledge base;
  performing the structured API update operations on the structured API of the knowledge base to cause the knowledge base to update structured content items of the knowledge base;
  converting structured content items obtained by performing the structured API query operations to natural language output statements;
  performing at least one of (i) augmenting at least one of the natural language queries by adding, to the natural language query, an identifier for one or more objects in the knowledge base that are referenced in the natural language query, or (ii) providing, with at least one of the natural language output statements, one or more identifiers that are recognized by the software application that provided the natural language query that corresponds to the natural language output statement; and
  providing the natural language output statements to the multiple software applications;
  wherein the natural language front end is configured to (i) enable multiple software applications to interact with the knowledge base using a natural language interface provided by the natural language front end and (ii) interact with the knowledge base using the structured API of the knowledge base.

19. The one or more non-transitory computer storage media of claim 18, wherein each software application in the software applications includes a natural language query generation module to generate a natural language query according to a user interaction that is other than providing the natural language query with a software application.

20. The one or more non-transitory computer storage of claim 18, the operations further comprising:
  obtaining one or more respective data identifiers for one or more data items in structured content items obtained by the structured API query operations; and
  including the one or more data identifiers to identify terms in the natural language output statements.

21. The one or more non-transitory computer storage medium of claim 18, the operations further comprising:
  providing non-natural language output statements corresponding to the natural language output statements.

22. The one or more non-transitory computer storage of claim 18, wherein:
  the natural language front end includes a conversion database that includes a respective application schema for each of one or more of the software applications, wherein each application schema defines mappings between (i) terms in the natural language queries and the natural language update statements received from the software application corresponding to the respective application schema, and (ii) terms included in the data schema of the knowledge base; and
  the conversion database includes the data schema of the knowledge base.

23. The one or more non-transitory computer storage of claim 18, wherein:
  the knowledge base is a SQL database; and
  the structured API operations are SQL statements.

* * * * *

UNITED STATES PATENT AND TRADEMARK OFFICE
CERTIFICATE OF CORRECTION

| | | |
|---|---|---|
| PATENT NO. | : 10,719,667 B1 | Page 1 of 1 |
| APPLICATION NO. | : 14/818579 | |
| DATED | : July 21, 2020 | |
| INVENTOR(S) | : Roy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this
Eighth Day of June, 2021

Drew Hirshfeld
*Performing the Functions and Duties of the
Under Secretary of Commerce for Intellectual Property and
Director of the United States Patent and Trademark Office*